United States Patent
Leskinen et al.

(10) Patent No.: US 10,946,357 B2
(45) Date of Patent: Mar. 16, 2021

(54) PROCESS FOR FEEDING A POLYMERISATION CATALYST

(71) Applicant: BOREALIS AG, Vienna (AT)

(72) Inventors: Pauli Leskinen, Helsinki (FI); Erno Elovainio, Helsinki (FI); Katri Nikkilä, Espoo (FI); Jukka-Pekka Parjanen, Porvoo (FI); Jani Aho, Helsinki (FI)

(73) Assignee: BOREALIS AG, Vienna (AT)

( * ) Notice: Subject to any disclaimer, the term of this patent is extended or adjusted under 35 U.S.C. 154(b) by 99 days.

(21) Appl. No.: 16/098,346

(22) PCT Filed: Apr. 28, 2017

(86) PCT No.: PCT/EP2017/060216
§ 371 (c)(1),
(2) Date: Nov. 1, 2018

(87) PCT Pub. No.: WO2017/191054
PCT Pub. Date: Nov. 9, 2017

(65) Prior Publication Data
US 2019/0176118 A1    Jun. 13, 2019

(30) Foreign Application Priority Data
May 2, 2016   (EP) .................................... 16167880

(51) Int. Cl.
*C08F 10/02*     (2006.01)
*C08F 210/16*   (2006.01)
(Continued)

(52) U.S. Cl.
CPC ............. *B01J 8/0035* (2013.01); *B01J 8/002* (2013.01); *B01J 8/003* (2013.01); *B01J 8/0005* (2013.01);
(Continued)

(58) Field of Classification Search
CPC C08F 2/01; C08F 10/00; C08F 110/00; C08F 210/00
See application file for complete search history.

(56) References Cited

U.S. PATENT DOCUMENTS 3,168,872 A    2/1965  Pinkerton
3,262,922 A    7/1966  Payne
(Continued)

FOREIGN PATENT DOCUMENTS

DE              248634 C        6/1912
DE          26 52 346 A1  *  5/1978 .............. F04B 21/08
(Continued)

OTHER PUBLICATIONS

George J. P. Britovsek et al., "The Search for New-Generation Olefin Polymerization Catalysts: Life beyond Metallocenes", Angewandte Chemie International Edition, 1999, pp. 428-447, vol. 38, Wiley-VCH Verlag GmbH.
(Continued)

*Primary Examiner* — Rip A Lee
(74) *Attorney, Agent, or Firm* — Insigne LLP

(57) ABSTRACT

The present invention is directed to a process for feeding a polymerisation catalyst into a polymerisation reactor (7), comprising the steps of: (i) maintaining a catalyst slurry comprising a diluent and a solid catalyst component in a catalyst feed vessel (4); (ii) continuously withdrawing a stream of the catalyst slurry from the catalyst feed vessel (4); and (iii) introducing the withdrawn portion of the catalyst slurry into the polymerisation reactor (7), wherein the catalyst slurry is transferred by using a valveless piston pump (5) from the catalyst feed vessel (4) into the polymerisation reactor (7); the diluent has a dynamic viscosity of from 0.01 to 20 mPas at the conditions within the catalyst feed vessel (4), and wherein the catalyst slurry is transferred along a
(Continued)

substantially vertical path downwards from the catalyst feed vessel (4) to the reactor (7).

20 Claims, 1 Drawing Sheet

(51) Int. Cl.
  *B01J 8/00* (2006.01)
  *B01J 8/22* (2006.01)
  *C08F 2/01* (2006.01)
  *C08F 10/00* (2006.01)

(52) U.S. Cl.
  CPC ...... *B01J 8/22* (2013.01); *C08F 2/01* (2013.01); *C08F 10/00* (2013.01); *B01J 2208/00212* (2013.01); *B01J 2208/00752* (2013.01); *B01J 2208/00787* (2013.01)

(56) References Cited

U.S. PATENT DOCUMENTS

| | | | |
|---|---|---|---|
| 3,294,772 A | | 12/1966 | Cottle |
| 4,121,029 A | | 10/1978 | Irvin et al. |
| 4,531,897 A | * | 7/1985 | Orlita ............... F04B 7/06 417/500 |
| 4,613,484 A | | 9/1986 | Ayres et al. |
| 4,708,605 A | * | 11/1987 | Orlita ............... F04B 7/06 417/500 |
| 4,758,089 A | | 7/1988 | Yokokura et al. |
| 5,385,992 A | * | 1/1995 | Koskinen ........... B01J 8/002 526/79 |
| 5,472,320 A | | 12/1995 | Weisbrodt |
| 6,872,682 B1 | * | 3/2005 | Alastalo ........... C08F 10/00 502/103 |
| 7,645,843 B2 | * | 1/2010 | Elovainio ......... C08F 10/00 526/88 |
| 8,728,971 B2 | * | 5/2014 | Brusselle ........... G05D 16/02 502/152 |
| 9,273,157 B2 | * | 3/2016 | Brusselle ........... C08F 10/02 |
| 2013/0118592 A1 | * | 5/2013 | Dewachter .......... C08F 210/16 137/1 |

FOREIGN PATENT DOCUMENTS

| | | |
|---|---|---|
| EP | 0022376 A2 | 1/1981 |
| EP | 0071454 A1 | 2/1983 |
| EP | 0099774 A1 | 2/1984 |
| EP | 0249689 A1 | 12/1987 |
| EP | 0815929 A1 | 1/1988 |
| EP | 0260130 A1 | 3/1988 |
| EP | 0423101 A2 | 4/1991 |
| EP | 0472491 A1 | 2/1992 |
| EP | 0517183 A2 | 12/1992 |
| EP | 0537130 A1 | 4/1993 |
| EP | 0560312 A1 | 9/1993 |
| EP | 0688794 A1 | 12/1995 |
| EP | 0713888 A2 | 5/1996 |
| EP | 0810235 A2 | 12/1997 |
| EP | 0823919 B1 | 9/1999 |
| EP | 1125626 A1 | 8/2001 |
| EP | 1378528 A1 | 1/2004 |
| EP | 1415999 A1 | 5/2004 |
| EP | 1671697 A1 | 6/2006 |
| EP | 2532687 A2 | 12/2012 |
| EP | 2 617 741 A1 * | 7/2013 ............ C08F 10/00 |
| EP | 2617741 A1 | 7/2013 |
| GB | 1532332 A | 11/1978 |
| WO | 9212181 A1 | 7/1992 |
| WO | 9212182 A1 | 7/1992 |
| WO | 9216747 A1 | 10/1992 |
| WO | 9618662 A1 | 6/1996 |
| WO | 9710248 A1 | 3/1997 |
| WO | 9728170 A1 | 8/1997 |
| WO | 9840331 A1 | 9/1998 |
| WO | 9846616 A1 | 10/1998 |
| WO | 9849208 A1 | 11/1998 |
| WO | 9856831 A1 | 12/1998 |
| WO | 9858975 A1 | 12/1998 |
| WO | 9858976 A1 | 12/1998 |
| WO | 9910353 A1 | 3/1999 |
| WO | 9912981 A1 | 3/1999 |
| WO | 9919335 A1 | 4/1999 |
| WO | 9941290 A1 | 8/1999 |
| WO | 9951646 A1 | 10/1999 |
| WO | 0034341 A2 | 6/2000 |
| WO | 0047638 A2 | 8/2000 |
| WO | 0105845 A1 | 1/2001 |
| WO | WO 01/25633 A1 * | 4/2001 ............ F04B 7/06 |
| WO | 0148034 A2 | 7/2001 |
| WO | 0155230 A1 | 8/2001 |
| WO | 0170395 A2 | 9/2001 |
| WO | 0202576 A1 | 1/2002 |
| WO | 03037941 A1 | 5/2003 |
| WO | 03106510 A1 | 12/2003 |
| WO | 2004057278 A2 | 7/2004 |
| WO | 2005012371 A2 | 2/2005 |
| WO | 2005105863 A2 | 11/2005 |
| WO | 2005118655 A1 | 12/2005 |
| WO | 2006097497 A1 | 9/2006 |
| WO | 2007107448 A1 | 9/2007 |
| WO | 2007116034 A1 | 10/2007 |
| WO | 2009027075 A2 | 3/2009 |
| WO | 2009054832 A1 | 4/2009 |
| WO | 2012001052 A2 | 1/2012 |
| WO | 2012013797 A1 | 2/2012 |

OTHER PUBLICATIONS

International Search Report & Written Opinion of the International Searching Authority issued in International Application No. PCT/EP2017/060216 dated Aug. 2, 2017.

* cited by examiner

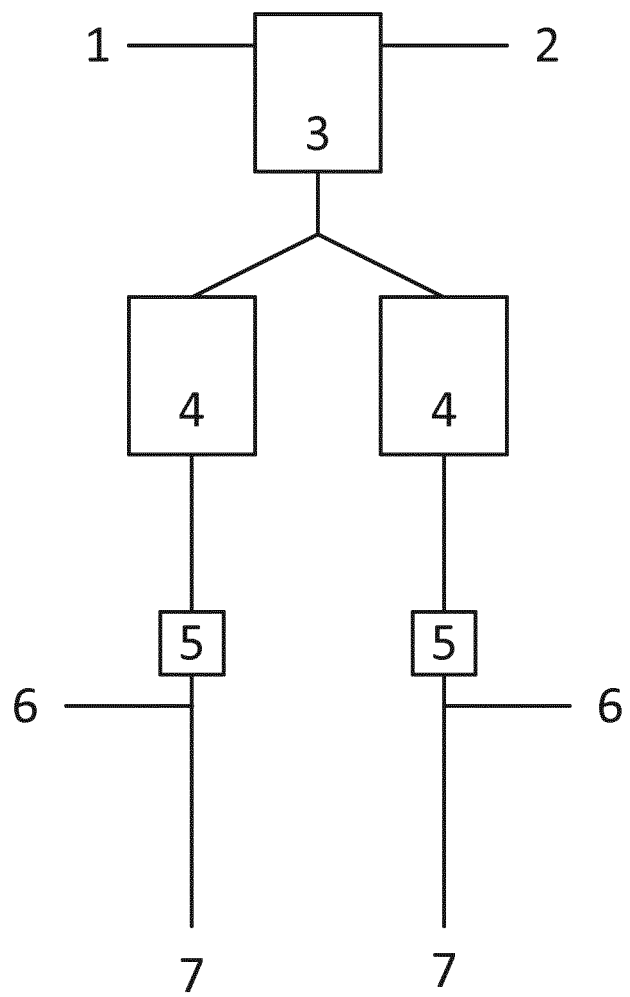

PROCESS FOR FEEDING A POLYMERISATION CATALYST

FIELD OF THE INVENTION

The present invention deals with a process of producing olefin polymers in the presence of an olefin polymerisation catalyst. More specifically, the present invention deals with a method of transferring a solid polymerisation catalyst component into the polymerisation reactor.

Problem to be Solved

WO-A-92/16747 discloses a device and a method for metering a viscous mixture of a wax and a polymerisation catalyst into the polymerisation reactor by using a valveless piston pump. It was disclosed that the catalyst—wax mixture having a viscosity of from 0.1 to 500000 mPa·s could be used. However, it was reported that the catalyst was mixed with a solution of polyethylene wax and liquid poly-alpha-olefin, where the viscosity of the polyethylene wax—poly-alpha-olefin mixture was 4500 mPa·s in the feed conditions.

U.S. Pat. No. 7,645,843 B discloses a device and a method where olefins are polymerised in the presence of a solid catalyst component and optionally a cocatalyst. The solid catalyst component is introduced into the polymerisation reactor by suspending the solid component into oil having a viscosity of from 20 to 1500 mPa·s. Optionally, the suspension comprises a drag reduction agent dissolved in the oil. The suspension is metered into the polymerisation reactor by using a valveless piston pump.

The methods presented in the above-mentioned publications are accurate and sufficient when the catalyst has a high productivity, which is the case, for instance, with most Ziegler-Natta catalysts. However, some catalysts, for instance certain metallocene catalysts, have a lower productivity and therefore they have to be fed at a greater feed rate to the polymerisation reactor. The above-mentioned methods are not well suited for feeding large quantities of polymerisation catalyst because the slurry would need to have a high concentration of the catalyst and keeping such a slurry in a homogeneous state would require intensive mixing. The high energy input could further lead to attrition and disintegration of the catalyst particles. Furthermore, the oil which is used as a diluent in catalyst feed may remain in the finished polymer product and may thus contribute to the amount of extractable matter in the polymer.

SUMMARY OF THE INVENTION

The present invention provides a process for feeding a polymerisation catalyst into a polymerisation reactor, comprising the steps of: (i) maintaining a catalyst slurry comprising a diluent and a solid catalyst component in a catalyst feed vessel; (ii) continuously withdrawing a stream of the catalyst slurry from the catalyst feed vessel; and (iii) introducing the withdrawn portion of the catalyst slurry into the polymerisation reactor, wherein the catalyst slurry is transferred by using a valveless piston pump from the catalyst feed vessel into the polymerisation reactor; the diluent has a dynamic viscosity of from 0.01 to 20 mPas at the conditions within the catalyst feed vessel, characterised in that the catalyst slurry is transferred along a substantially vertical path downwards from the feed vessel to the reactor.

The present invention provides a simple system for feeding the catalyst. It has low investment costs and provides an accurate catalyst feed. Furthermore the method is easy to control and is reliable in operation.

DESCRIPTION OF FIGURES

FIG. 1 shows an exemplary flow scheme of the process.

DETAILED DESCRIPTION

The present invention is directed to a method of feeding a solid polymerisation catalyst component into the polymerisation reactor. In the subsequent text the terms "polymerisation catalyst", "catalyst", "solid polymerisation catalyst component" and "solid catalyst component" are used synonymously to indicate the solid polymerisation catalyst component unless it is clear from the context that something else is meant.

The subsequent text refers to catalyst slurry. Such catalyst slurry may be a homogeneous (mixed) slurry or concentrated (settled) slurry. The homogeneous slurry is maintained in homogeneous state by continuous mixing and the solids content of the slurry is the same in all parts of the vessel. The concentrated slurry is formed when the agitation is stopped. Then the solid catalyst component settles and forms the concentrated slurry in the bottom of the vessel and a dilute phase above the concentrated slurry. The solids content of the dilute phase is close to zero.

Solid Catalyst Component

Any polymerisation catalyst can be introduced into the polymerisation reactor according to the method of the present invention. The method is especially useful when using catalysts having a relatively low productivity, such as, not more than 10 kg polymer per one gram of catalyst, or not more than 5 kg polymer per one gram of catalyst. Thereby the problem of the presence of excess oil in the polymerisation process can be avoided. However, as the present method allows the catalyst feed rate to be varied over a wide range the method is useful also for catalysts having a high activity.

One group of catalysts for which the present method is especially useful is the group of catalysts comprising an organometallic compound which comprises a transition metal (M) of Group 3 to 10 of the Periodic Table (IUPAC 2007) or of an actinide or lanthanide.

The term "an organometallic compound" in accordance with the present invention includes any metallocene or non-metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In one embodiment the organometallic compound has the following formula (I):

$$(L)_m R_n MX_q \quad (I)$$

wherein
"M" is a transition metal (M) transition metal (M) of Group 3 to 10 of the Periodic Table (IUPAC 2007); each "X" is independently a monoanionic ligand, such as a σ-ligand; each "L" is independently an organic ligand which coordinates to the transition metal "M"; "R" is a bridging group linking said organic ligands (L); "m" is 1, 2 or 3, preferably 2; "n" is 0, 1 or 2, preferably 1; "q" is 1, 2 or 3, preferably 2; and m+q is equal to the valency of the transition metal (M).

"M" is preferably selected from the group consisting of zirconium (Zr), hafnium (Hf), or titanium (Ti), more preferably selected from the group consisting of zirconium (Zr) and hafnium (Hf).

In a more preferred definition, each organic ligand (L) is independently (a) a substituted or unsubstituted cyclopentadienyl or a bi- or multicyclic derivative of a cyclopentadienyl which optionally bears further substituents and/or one or more hetero ring atoms from a Group 13 to 16 of the Periodic Table (IUPAC); or (b) an acyclic $\eta^1$- to $\eta^4$- or $\eta$-ligand composed of atoms from Groups 13 to 16 of the Periodic Table, and in which the open chain ligand may be fused with one or two, preferably two, aromatic or non-aromatic rings and/or bear further substituents; or (c) a cyclic $\eta^1$- to $\eta^4$- or $\eta^6$-, mono-, bi- or multidentate ligand composed of unsubstituted or substituted mono-, bi- or multicyclic ring systems selected from aromatic or non-aromatic or partially saturated ring systems, such ring systems containing optionally one or more heteroatoms selected from Groups 15 and 16 of the Periodic Table.

Organometallic compounds preferably used in the present invention, have at least one organic ligand (L) belonging to the group (a) above. Such organometallic compounds are called metallocenes.

More preferably at least one of the organic ligands (L), preferably both organic ligands (L), is (are) selected from the group consisting of cyclopentadienyl, indenyl, tetrahydroindenyl, fluorenyl, which can be independently substituted or unsubstituted.

Further, in case the organic ligands (L) are substituted it is preferred that at least one organic ligand (L), preferably both organic ligands (L), comprise one or more substituents independently selected from $C_1$ to $C_{20}$ hydrocarbyl or silyl groups, which optionally contain one or more heteroatoms selected from groups 14 to 16 and/or are optionally substituted by halogen atom(s), The term $C_1$ to $C_{20}$ hydrocarbyl group, whenever used in the present application, includes $C_1$ to $C_{20}$ alkyl, $C_2$ to $C_{20}$ alkenyl, $C_2$ to $C_{20}$ alkynyl, $C_3$ to $C_{20}$ cycloalkyl, $C_3$ to $C_{20}$ cycloalkenyl, $C_6$ to $C_{20}$ aryl, $C_7$ to $C_{20}$ alkylaryl or $C_7$ to $C_{20}$ arylalkyl groups or mixtures of these groups such as cycloalkyl substituted by alkyl.

Further, two substituents, which can be same or different, attached to adjacent C-atoms of a ring of the ligands (L) can also, taken together, form a further mono or multicyclic ring fused to the ring.

Preferred hydrocarbyl groups are independently selected from (1) linear or branched $C_1$ to $C_{10}$ alkyl groups, optionally interrupted by one or more heteroatoms of groups 14 to 16, like O, N or S, and substituted or unsubstituted $C_6$ to $C_{20}$ aryl groups; (2) linear or branched $C_1$ to $C_{10}$ alkyl groups, optionally interrupted by one or more heteroatoms of groups 14 to 16, are more preferably selected from methyl, ethyl, propyl, isopropyl, tertbutyl, isobutyl, $C_{5-6}$ cycloalkyl, OR, SR, where R is $C_1$ to $C_{10}$ alkyl group; (3) $C_6$ to $C_{20}$ aryl groups are more preferably phenyl groups, optionally substituted with 1 or 2 $C_1$ to $C_{10}$ alkyl groups as defined above.

By "σ-ligand" is meant throughout the invention a group bonded to the transition metal (M) via a sigma bond.

Further, the ligands "X" are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

More preferably "X" ligands are selected from halogen, $C_1$ to $C_6$ alkyl, $C_5$ to $C_6$ cycloalkyl, $C_1$ to $C_6$ alkoxy, phenyl and benzyl groups.

The bridging group "R" may be a divalent bridge, preferably selected from ≥R'$_2$C—, —R'$_2$C—CR'$_2$—, —R'$_2$Si—, —R'$_2$Si—Si R'$_2$—, —R'$_2$Ge—, wherein each R' is independently a hydrogen atom, $C_1$ to $C_{20}$ alkyl, $C_2$ to $C_{10}$ cycloalkyl, tri($C_1$-$C_{20}$-alkyl)silyl, $C_7$-$C_{20}$-aryl, $C_7$-$C_{20}$ arylalkyl and $C_7$-$C_{20}$-alkylaryl.

More preferably the bridging group "R" is a divalent bridge selected from —R'$_2$C—, —R'$_2$Si—, wherein each R' is independently a hydrogen atom, $C_1$ to $C_{20}$ alkyl, $C_2$ to $C_{10}$ cycloalkyl, $C_6$-$C_{20}$-aryl, $C_7$-$C_{20}$ arylalkyl and $C_7$-$C_{20}$-alkylaryl.

Another subgroup of the organometallic compounds (C) of formula (I) is known as non-metallocenes wherein the transition metal (M), preferably a Group 4 to 6 transition metal, suitably Ti, Zr or Hf, has a coordination ligand other than a cyclopentadienyl ligand.

The term "non-metallocene" used herein means compounds, which bear no cyclopentadienyl ligands or fused derivatives thereof, but one or more non-cyclopentadienyl $\eta$-, or $\rho$-, mono-, bi- or multidentate ligand. Such ligands can be chosen e.g. from the groups (b) and (c) as defined above and described e.g. in WO 01/70395, WO 97/10248, WO 99/41290, and WO 99/10353), and further in V. C. Gibson et al., in Angew. Chem. Int. Ed., engl., vol 38, 1999, pp 428 447, the disclosures of which are incorporated herein by reference.

However, the organometallic compound (C) of the present invention is preferably a metallocene as defined above.

Metallocenes are described in numerous patents. In the following just a few examples are listed: EP-A-260130, WO-A-97/28170, WO-A-98/46616, WO-A-98/49208, WO-A-98/040331, WO-A-99/12981, WO-A-99/19335, WO-A-98/56831, WO-A-00/34341, WO-A-00/148034, EP-A-423101, EP-A-537130, WO-A-2002/02576, WO-A-2005/105863, WO-A-2006097497, WO-A-2007/116034, WO-A-2007/107448, WO-A-2009/027075, WO-A-2009/054832, WO-A-2012/001052, and EP-A-2532687. Further, metallocenes are described widely in academic and scientific articles.

Metallocene catalyst is used together with an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

The organometallic compound as defined above and the activator are solidified. According to one embodiment the organometallic compound and the activator are supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Alternatively, the support may have an average particle size of from 30 a 80 μm, preferably from 30 to 50 μm. Examples of suitable support materials are, for instance, ES747JR produced and marketed by Ineos Silicas, and SP9-491, produced and marketed by Grace.

Another group of catalysts is the group of Ziegler—Natta catalysts based on a transition metal, such as titanium, zirconium and/or vanadium. Suitable Ziegler—Natta catalysts preferably contain a magnesium compound, an aluminium compound and a titanium compound.

Optionally, the catalyst is supported on a particulate support. The particulate support can be an inorganic oxide support, such as silica, alumina, titania, silica-alumina and silica-titania.

Preferably, the support is silica.

The average particle size of the silica support can be typically from 10 to 100 μm. However, it has turned out that special advantages can be obtained if the support has an average particle size from 7 to 30 μm, preferably from 9 to 25 μm. Alternatively, the support may have an average particle size of from 30 a 80 m, preferably from 30 to 50 μm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Alternatively, the Ziegler—Natta catalyst contains a titanium compound together with a magnesium halide compound where the magnesium halide compound acts as a support. Thus, the catalyst contains a titanium compound on a magnesium dihalide, like magnesium dichloride. Such catalysts are disclosed, for instance, in WO-A-2005/118655 and EP-A-810235. Such catalysts may have an average particle size within a broad range, such as from 3 to 100 μm. Typically the particle size is at the lower end of the range, such as from 5 to 30 μm.

Still a further type of Ziegler-Natta catalysts are the catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, whereby the catalyst in the form of solid particles is formed. The principles of preparation of these types of catalysts are given, for instance, in WO-A-2003/106510. Also in this case the catalysts may have an average particle size within a broad range, such as from 3 to 100 μm.

The Catalyst Slurry

The catalyst slurry is prepared by combining the solid catalyst component with a diluent. The diluent may be any liquid which is inert towards the catalyst. Suitable diluents are hydrocarbons having at least 3 carbon atoms. However, because in the present invention the solid catalyst component is allowed to settle in the diluent it is preferred that the viscosity of the diluent at the conditions within the catalyst feed vessel is relatively low, preferably not more than 20 mPa·s, more preferably not more than 10 mPa·s and even more preferably not more than 5.0 mPa·s. Especially preferably the diluent is selected from the group consisting of $C_3$ to $C_{10}$ hydrocarbons and the mixtures thereof. In particular, the diluent is selected from the group consisting of propane, n-butane, isobutane, n-pentane, isopentane and the mixtures thereof.

According to an especially preferred embodiment the diluent is the same as the polymerisation diluent used in the polymerisation process. Especially preferably the diluent is then selected from the group consisting of propane, n-butane, isobutane, n-pentane, isopentane and the mixtures thereof. In particular the diluent is propane, n-butane, isobutane or a mixture thereof.

The catalyst slurry may be prepared directly in the catalyst feed vessel. However, it is preferred to prepare the catalyst slurry in a mixing vessel into which the solid catalyst component and the diluent are introduced. From the mixing vessel the slurry is then transferred to the catalyst feed vessel. The slurry may be transferred from the mixing vessel into the catalyst feed vessel by using any convenient means. Most preferably, the slurry is transferred by pressurising the mixing vessel to a pressure which is greater than the pressure of the catalyst feed vessel and using the pressure difference for transferring the slurry to the catalyst feed vessel.

According to a suitable method the solid catalyst component and the diluent having the viscosity at the conditions within the catalyst feed vessel of not more than 20 mPa·s are mixed in the mixing vessel for a period of from 10 minutes to 10 hours, preferably from 20 minutes to 5 hours. The temperature and the pressure are not critical during the mixing. However, excessively high temperature should be avoided so that catalyst activity is not lost. It is preferred that the temperature is close to the ambient temperature, such as from −5° C. to +40° C. The pressure should be such that the diluent remains as a liquid. Thereby for most diluents a pressure from about atmospheric pressure to about 100 bar would be suitable.

It is also possible to allow the slurry to settle in the mixing vessel after the preparation. Then the settled slurry is transferred to the catalyst feed vessel. This procedure is suitable when concentrated, or settled, slurry is withdrawn from the catalyst feed vessel. Suitable settling time could be, for instance, from 10 minutes to 10 hours, preferably from 20 minutes to 5 hours.

Catalyst Feed Vessel

The catalyst is transferred from the catalyst feed vessel to the polymerisation reactor. The catalyst is withdrawn from the bottom part of the catalyst feed vessel.

Preferably the catalyst feed vessel has a generally conical downwards tapering bottom section. Above the bottom section and in direct contact therewith is a generally cylindrical upper section. The catalyst is suitably withdrawn from the conical bottom section, preferably from the lowest part thereof.

The catalyst vessel may also contain, and preferably contains, a heating or cooling jacket which may be used for maintaining the catalyst feed vessel at a desired temperature. The temperature and the pressure in the catalyst feed vessel are not critical. However, excessively high temperature should be avoided so that catalyst activity is not lost. It is preferred that the temperature is close to the ambient temperature, such as from −5° C. to +40° C. The pressure should be such that the diluent remains as a liquid. Furthermore, the pressure should be greater than the pressure in the polymerisation reactor. The pressure could thus be from atmospheric to about 100 bar, preferably from 10 to 100 bar, such as from 20 to 100 bar, depending on the pressure in the polymerisation reactor.

According to one embodiment a stream of concentrated catalyst slurry is withdrawn from the catalyst feed vessel. In such embodiment the catalyst feed vessel may, but it does not need to contain an agitator. When the catalyst slurry is prepared in a separate mixing vessel an agitator is not needed.

The catalyst slurry is then allowed to settle in the catalyst feed vessel. The settling is obtained when the slurry is maintained in the catalyst feed vessel without agitation for a certain time period. Thereby a concentrated catalyst slurry, or a catalyst mud, is formed at the bottom part of the catalyst feed vessel. A dilute phase, comprising practically only the diluent, possibly with some catalyst fines, is formed at the top part of the catalyst vessel.

It is recommended that the catalyst slurry is allowed to settle for some time in the catalyst feed vessel before the catalyst withdrawal is started. Suitable settling time could be, for instance, from 10 minutes to 10 hours, preferably from 20 minutes to 5 hours. The settling time may be shorter if the slurry has settled already in the mixing vessel.

According to an alternative embodiment a stream of homogeneous slurry is withdrawn from the catalyst feed vessel. If this is desired then the catalyst feed vessel needs to contain an agitator to keep the slurry in homogeneous state.

The catalyst feed vessel may be equipped with a level sensor capable of estimating the level of the catalyst slurry. For instance, radioactive level measurement instruments may be used. They can be used both for measuring the level of the concentrated (or settled) slurry in the feed vessel and the level of homogeneous slurry. By using the level measurement the operators can prepare a new batch of catalyst slurry either in the mixing vessel or in a second catalyst feed vessel. When the catalyst slurry (or the concentrated catalyst slurry) in the first catalyst feed vessel comes to an end then the operators can either stop the catalyst slurry withdrawal from the first catalyst feed vessel and start it from the second catalyst feed vessel, or alternatively transfer a new batch of catalyst slurry into the catalyst feed vessel from the mixing vessel.

It is also possible to transfer small portions of slurry from the mixing vessel to the catalyst feed vessel either continuously or intermittently. When using such procedure it is possible to keep the level of the catalyst slurry or concentrated catalyst slurry substantially constant in the catalyst feed vessel.

The catalyst feed vessel must be maintained in inert atmosphere. Especially, the presence of oxygen and moisture should be avoided. Therefore, all the connections to the vessel, such as pipe joints and agitator shaft bearing need to be carefully designed to eliminate the leaks from the atmosphere. Also the process chemicals, such as the lubricating oil for the bearings, needs to be selected so that they do not contain components that are harmful for the catalyst, or alternatively, their carryover into the catalyst feed vessel needs to be prevented. Especially preferred lubricating oils are, for instance, hydrocarbon oils containing less than 100 parts per million (ppm) of compounds containing oxygen, sulphur or halogen groups. Even more preferably, the content of such compounds is less than 50 ppm and in particular less than 10 ppm. Examples of suitable oils are mineral oils and synthetic oils comprising essentially of hydrocarbons containing from about 15 to about 50 carbon atoms: Synton PAO 100™, which is a synthetic oil supplied by Crompton Petroleum Additives; Shell Cassida HF 15™, Shell Cassida HF 32™, Shell Cassida 46™, Shell Cassida HF 68™ and Shell Cassida HF 100™, which are synthetic oils supplied by Shell; Drakeol 35™, which is a synthetic oil supplied by Penreco; Ondina 68™, which is a mineral oil supplied by Shell and Primol 352™, which is supplied by ExxonMobil.

The gas phase in the catalyst feed vessel should preferably consist of nitrogen, argon and similar inert gases, or their mixtures. It may also comprise or consist of the diluent in vapour form, such as propane, isobutane or n-butane. Also, the catalyst feed vessel should be equipped with possibility to flush the vessel with inert gas, preferably with nitrogen.

The concentration of the solid catalyst component can be selected freely so that the desired catalyst feed rate is conveniently obtained. If the catalyst slurry is meant to be homogeneous, said concentration must not be too high, as otherwise it may be difficult to maintain stable slurry. On the other hand, too low concentration may result in having an excessively great feed rate. It has been found that suitable catalyst concentration is from 50 to 500 kg/m$^3$, preferably from 100 to 400 kg/m$^3$ and in particular from 150 to 300 kg/m$^3$, based on the volume of the slurry.

If the slurry is meant to be concentrated then the concentration is determined by the particle properties of the catalyst. The density of the concentrated slurry is then close to the settled bulk density of the specific catalyst, such as from 200 to 1000 kg/m$^3$, preferably from 400 to 520 kg/m$^3$.

Transfer of the Catalyst

The concentrated catalyst slurry is transferred into the polymerisation reactor by using a valveless piston pump. Examples of such pumps and their use are given in WO-A-92/16747, WO-A-00/47638, U.S. Pat. Nos. 7,645,843 B, 3,168,872 A, 5,472,320 A and DE-C-248634. Such pumps are supplied, among others, by Prominent under a trade name "Orlita" and Sven.

The catalyst slurry is transferred from the feed vessel to the polymerisation reactor along a substantially vertical flow path downwards. By "substantially vertical" it is meant that the flow path does not contain horizontal segments where the catalyst could settle in the feed line. Preferably the flow path has an inclination which is from 45° to 135° with horizontal plane.

The catalyst transfer line between the valveless piston pump and the polymerisation reactor may be equipped with a catalyst flow meter. Flow meters suitable for measuring the catalyst feed rate are disclosed in WO-A-2004/057278, or are commercially available, among others, from Oxford Instruments. Such a flow meter may also be used as a part of a control loop to control the catalyst feed rate. For example, a signal from the flow meter is compared with a predetermined set value, and the signal to the metering pump is adjusted based on the difference.

When the activator and/or electron donor is used, it may be mixed with the catalyst slurry in different ways. One alternative is to introduce the activator and/or electron donor to the catalyst feed vessel. Another alternative is to combine the activator and/or the electron donor with the catalyst slurry in the catalyst feed line. A third alternative is to introduce the activator and/or the electron donor directly into the polymerisation reactor. In addition, in some cases it may be beneficial to use a combination of two of the three methods discussed above or a combination of all of them.

In some cases it is beneficial to combine the catalyst slurry with the activator and/or the electron donor in the catalyst feed line. Then it is possible to add the activator feed stream and/or the electron donor feed stream directly to the catalyst slurry feed stream and allow the activator and/or the electron donor to contact with the catalyst in the feed line. It is also possible to contact the catalyst slurry, the activator and/or the electron donor in a static mixer. This produces an intimate contact with the catalyst components and is recommended where it is essential to activate the catalyst prior to the introduction into the polymerisation reactor. Static mixers are generally known in the art. More information on static mixers is given, among others, in EP-A-1125626, EP-A-815929, EP-A-472491, U.S. Pat. No. 4,758,089 A and EP-A-71454. Their use in catalyst feed is discussed, for instance, in WO-A-01/05845 and EP-A-823919. Static mixers are supplied, among others, by Sulzer and Chemineer.

Polymerisation Process

The polymerisation may be conducted in any method that is known in the art, such as in slurry, solution or gas phase. As the method of the invention does not cause notable attrition and disintegration of the catalyst particles during the catalyst feed, it is particularly suitable for particle forming processes, such as slurry or gas phase.

In some cases it is preferred that the polymerisation stage is preceded by a prepolymerisation stage. In prepolymerisation a small amount of an olefin, preferably from 0.1 to 500 grams of olefin per one gram catalyst is polymerised. Usually the prepolymerisation takes place at a lower temperature and/or lower monomer concentration than the actual polymerisation. Typically, the prepolymerisation is conducted as a continuous process at a temperature within the range of from 0 to 70° C., preferably from 10 to 60° C. Usually, but not necessarily, the monomer used in the prepolymerisation is the same that is used in the subsequent polymerisation stage(s). It is also possible to feed more than one monomer into the prepolymerisation stage. Description of prepolymerisation can be found in e.g. WO-A-96/18662, WO-A-03/037941, GB-A-1532332, EP-A-517183, EP-A-560312 and EP-A-99774.

In the polymerisation process one or more alpha-olefins having from 2 to 20 carbon atoms can be polymerised. Especially ethylene and/or propylene, optionally together with higher alpha-olefins are polymerised. The polymers obtained from the process include all the olefin polymers and copolymers known in the art, such as high density polyethylene (HDPE), medium density polyethylene (MDPE), linear low density polyethylene (LLDPE), polypropylene homopolymers, random copolymers of propylene and ethylene or propylene and higher alpha-olefins, heterophasic copolymers of propylene and ethylene, poly-1-butene and poly-4-methyl-1-pentene. When higher alpha-olefins are used as comonomers, they are preferably selected from the group consisting of 1-butene, 1-hexene, 4-methyl-1-pentene, 1-octene and 1-decene.

It is within the scope of the invention to conduct the polymerisation in at least one polymerisation stage. It is also known in the art to polymerise in at least two polymerisation stages to produce bimodal polyolefins, such as bimodal polyethylene and bimodal polypropylene, as disclosed in WO-A-92/12182, EP-A-22376, EP-A-713888 and WO-A-98/58975. Further, multistage polymerisation may be used to produce heterophasic propylene copolymers, as disclosed in WO-A-98/58976. It is to be understood that the present invention is not limited to any specific number of polymerisation stages, but any number is possible.

If the polymerisation is conducted as a slurry polymerisation, any suitable reactor type known in the art may be used. A continuous stirred tank reactor and a loop reactor are suitable examples of useful reactor types. Especially, a loop reactor is preferred because of its flexibility.

The slurry polymerisation may be conducted in normal liquid slurry conditions or alternatively so that the temperature and the pressure within the reactor exceed the critical temperature and pressure of the fluid mixture within the reactor. Such a polymerisation method is called supercritical slurry polymerisation. Description of liquid slurry polymerisation is given, among others, in EP-A-249689 and U.S. Pat. No. 3,262,922 A and supercritical slurry polymerisation in WO-A-92/12181 and U.S. Pat. No. 3,294,772 A.

The slurry may be withdrawn from the reactor in any method known in the art, including continuous and intermittent withdrawal. If the withdrawal is intermittent, it may be realised by using so called settling legs, where the slurry is allowed to settle before discharging the settled slurry from the reactor. Settling legs are generally known in the art and they are described, for instance, in U.S. Pat. Nos. 4,613,484 A and 4,121,029 A.

If the slurry is withdrawn continuously from the reactor, then it may be withdrawn without a concentration step or it may be concentrated either before or after the withdrawal. For economic reasons it is preferred to concentrate the slurry. Suitable methods of concentration are, among others, hydrocyclone or sieve. Typically in such a method the slurry is withdrawn continuously from the reactor and passed through a concentration device, such as hydrocyclone or sieve. The bottom flow is directed to product withdrawal whereas the overflow is recycled to the polymerisation reactor. Such methods are disclosed, for instance, in EP-A-1415999.

FIG. 1 shows an exemplary flow sheet of the process. The process includes a mixing vessel (3). Into the mixing vessel (3) diluent and solid catalyst component are transferred via lines (1) and (2). The mixing vessel is preferably equipped with an agitator (not shown) to facilitate the mixing of the solid catalyst component with the diluent.

The catalyst slurry, either homogeneous or settled, is transferred from the mixing vessel (3) into one of two catalyst feed vessels (4). Preferably the catalyst feed vessels (4) are located at a level which is below the level of the mixing vessel (3). Thereby the transfer of the catalyst slurry from the mixing vessel (3) to the feed vessels (4) occurs substantially downwards. When one of the catalyst feed vessels (4) is in operation a new batch of catalyst slurry can be produced in the mixing vessel (3) and, when ready, transferred into the other one of the catalyst feed vessels (4).

Meanwhile the catalyst slurry, either homogeneous or settled, is withdrawn from the bottom of the operating catalyst feed vessel (4) and measured with a valveless piston pump (5). The catalyst slurry stream is combined with a reactor feed stream (6), such as a diluent stream, downstream of the pump (5). The combined stream is then passed to the polymerisation reactor (7).

Advantages of the Invention

The process of the present invention provides a number of advantages over the prior art processes. The inventors have found that catalyst slurries can be produced more easily with low viscosity diluents than with diluents having a high viscosity. Thereby the amount of agglomerates in the catalyst slurry is less. Also, the inventors have found that when using the process of the present invention the final polymer product contains less inhomogeneities, such as gels or fish-eyes, after transitions from one catalyst to another, such as from Ziegler-Natta to metallocene, compared to the prior art process. In addition, the content of high-boiling impurities in the final product is reduced compared to prior art processes. Moreover, the process allows the use of a wide range of catalysts having different activities. Finally, the process provides an accurate and stable method for feeding the catalyst into the polymerisation reactor.

One further advantage of the method of the invention is that if combined with a continuous product withdrawal, it allows a truly continuous operation of the process. As both the catalyst feed and the product withdrawal are continuous, the polymerisation process is less likely to be disturbed by catalyst feed batches or product outtake batches. The process can be operated in a more stable fashion and this leads to problem-free and stable production.

By using the present method the solid catalyst component can be metered into the reactor with good accuracy without damaging the catalyst. Further, the catalyst can be fed into the polymerisation reactor in large quantities.

EXAMPLES

Example 1

An amount of 16 kg of a solid catalyst component, which had been produced according to Example 1 of EP-A-1378528, was mixed with 304 kg of n-heptane (the slurry containing thus 5% by weight of the solid catalyst component) in an agitated catalyst feed vessel for a period of two hours at ambient temperature (about 20° C.). Thereafter a stream of the catalyst slurry was withdrawn from the bottom of the vessel under continuous agitation. The catalyst slurry was metered into a downstream vessel by Orlita DR 15/12 non valve piston pump. The transfer line extended to the downstream vessel vertically downwards, at about 90° inclination to the horizontal plane. The pump was set to operate at such a rate that 5.0 kg/h slurry was transferred to the downstream vessel. The transfer line included a flow meter which indicated that the actual feed rate varied between 4.7 and 5.4 kilograms per hour. The equipment was operated in this way for 64 hours in a stable manner after which the test was stopped.

The dynamic viscosity of heptane at 20° C. is 0.42 mPas.

Example 2

The procedure of Example 1 was repeated except that the amounts of the solid catalyst component and heptane were changed and the content of the solid catalyst component in the slurry was 10% by weight. The flow meter indicated that the flow rate was 5.8 kg/h. The equipment was operated in this way for 76 hours in a stable manner after which the test was stopped.

Example 3

The procedure of Example 1 was repeated except that the amounts of the solid catalyst component and heptane were changed and the content of the solid catalyst component in the slurry was 20% by weight. The flow meter indicated that the flow rate was 4.2 kg/h. The equipment was operated in this way for five days in a stable manner after which the test was stopped.

In this the downstream receiving vessel was mounted on a balance for a period of two hours. From the balance reading it could be confirmed that the flow rate of the slurry was 4.1 kg/h.

Samples of the catalyst were taken both before and after the test. They were studied under the microscope. It was found that the shape and size of the catalyst particles were essentially similar before and after the test.

Example 4

The procedure of Example 1 was repeated except that the amounts of the solid catalyst component and heptane were changed and the content of the solid catalyst component in the slurry was 50% by weight. Furthermore, the agitation was stopped and the slurry was allowed to settle before starting the withdrawal of the slurry from the catalyst feed vessel. The flow meter indicated that the flow rate was 6 kg/h. The equipment was operated in this way for 40 minutes in a stable manner after which the test was stopped.

Samples of the catalyst were taken both before and after the test. They were studied under the microscope. It was found that the shape and size of the catalyst particles were essentially similar before and after the test.

Example 5

30.1 kg of solid catalyst component produced according to Example 1 of EP-A-1378528 is suspended in 102.9 kg of propane under agitation to produce a homogeneous catalyst slurry containing 22.6% by weight solids. The temperature of the slurry is maintained at about 25° C. The catalyst is metered by Orlita DR 15/12 non valve piston pump into a prepolymerisation reactor having a volume of 11 m$^3$ where ethylene is homopolymerised in propane diluent at 60 bar pressure and at the temperature of 40° C. The catalyst is transferred to the prepolymerisation reactor along a straight vertical downwards-directed pipe.

The feed rate of the catalyst slurry is such that approximately 0.3 kg/h of solid catalyst component is introduced into the prepolymerisation reactor. In addition to the solid catalyst component, about 5 kg/h of a solution of 10% by weight of triethylaluminium in pentane is introduced into the reactor. Ethylene, propane diluent and hydrogen are fed into the reactor in such amounts that the ethylene concentration is 1.6% by mole and the hydrogen to ethylene ratio is 50 mol/100 mol. The resulting polymer has a melt flow index MFR$_2$ of 20 g/10 min and density of 960 kg/m$^3$. The production rate is 0.36 tons/h. The polymer slurry is continuously withdrawn from the prepolymerisation reactor and introduced into a loop reactor where additional propane diluent, ethylene and hydrogen are introduced so that the ethylene concentration is about 7% by mole and the molar ratio of hydrogen to ethylene is about 700 mol/kmol. The temperature in the loop reactor is 95° C. and the pressure 59 bar. The polymer production rate in the loop reactor is about 7.5 tons/h and the polymer has a melt index MFR$_2$ of about 300 g/10 min and a density of about 975 kg/m$^3$. The polymer slurry is continuously withdrawn from the loop reactor, after which the hydrocarbons are removed and the polymer is transferred to a gas phase reactor for subsequent polymerisation by adding ethylene, hydrogen and 1-butene comonomer.

The operation of the prepolymerisation reactor, loop reactor and gas phase reactor is stable without problems. The process can be operated for several weeks without problems.

The invention claimed is:

1. A process for feeding a polymerisation catalyst into a polymerisation reactor, comprising the steps of:
   (i) maintaining a catalyst slurry comprising a diluent and a solid catalyst component in a catalyst feed vessel;
   (ii) continuously withdrawing a stream of the catalyst slurry from the catalyst feed vessel; and
   (iii) introducing a withdrawn portion of the catalyst slurry into the polymerisation reactor,
   wherein the catalyst slurry is transferred by using a valveless piston pump from the catalyst feed vessel into the polymerisation reactor; the diluent has a dynamic viscosity of from 0.01 to 20 mPas at conditions within the catalyst feed vessel, wherein the catalyst slurry is transferred along a substantially vertical path downwards from the catalyst feed vessel to the polymerisation reactor, wherein the diluent is selected from the group consisting of $C_3$ to $C_{10}$ hydrocarbons and mixtures thereof.

2. The process according to claim 1 wherein the diluent is selected from the group consisting of propane, n-butane, isobutane, n-pentane, isopentane and the mixtures thereof.

3. The process according to claim 1 wherein the catalyst is selected from the group consisting of Ziegler-Natta catalysts, metallocene catalysts, late transition metal catalysts and mixtures thereof.

4. The process according to claim 1 comprising a step of allowing the catalyst slurry to settle in the catalyst feed vessel thus forming a concentrated catalyst slurry in a lower part of the feed vessel and a dilute phase in an upper part of the catalyst feed vessel.

5. The process according to claim 1 comprising steps of (iv) introducing a volume of the solid catalyst component into a mixing vessel; (v) introducing a volume of the diluent into the mixing vessel, thereby forming the catalyst slurry; (vi) transferring the catalyst slurry from the mixing vessel to the catalyst feed vessel.

6. The process according to claim 5 wherein the catalyst slurry is allowed to settle in the mixing vessel.

7. The process according to claim 6 comprising a first catalyst feed vessel and a second catalyst feed vessel.

8. The process according to claim 7 wherein the catalyst is withdrawn from one of the first catalyst feed vessel or the second catalyst feed vessel while the other one of the first catalyst feed vessel or the second catalyst feed vessel is being prepared for receiving a new batch of catalyst slurry.

9. The process according to claim 8 comprising a step of monitoring a level of the catalyst slurry by means of a level sensor in the first catalyst feed vessel and the second catalyst feed vessel.

10. The process according to claim 9 comprising steps of stopping a withdrawal of the catalyst slurry from one of the first catalyst feed vessel or the second catalyst feed vessel and starting a withdrawal of the catalyst slurry from the other one of the first catalyst feed vessel or the second catalyst feed vessel in response to a signal from the level sensor.

11. The process according to claim 5 comprising a first catalyst feed vessel and a second catalyst feed vessel.

12. The process according to claim 11 wherein the catalyst slurry is withdrawn from one of the first catalyst feed vessel or the second catalyst feed vessel while the other one of the first catalyst feed vessel or the second catalyst feed vessel is being prepared for receiving a new batch of catalyst slurry.

13. The process according to claim 11 comprising a step of monitoring a level of the catalyst slurry by means of a level sensor in the first catalyst feed vessel and the second catalyst feed vessel.

14. The process according to claim 13 comprising steps of stopping a withdrawal of the catalyst slurry from one of the first catalyst feed vessel or the second catalyst feed vessel and starting a withdrawal of the catalyst slurry from the other one of the first catalyst feed vessel or the second catalyst feed vessel in response to a signal from the level sensor.

15. A process for polymerising at least one olefin in the polymerisation reactor comprising a step of feeding the polymerisation catalyst into the polymerisation reactor with the process according to claim 1.

16. The process according to claim 15 comprising the step of polymerising at least one olefin in the presence of a polymerisation diluent.

17. The process according to claim 16 wherein the polymerisation diluent is the same as the diluent in the catalyst feed vessel.

18. A process for polymerising at least one olefin in the polymerisation reactor comprising a step of feeding the polymerisation catalyst into the polymerisation reactor by the process according to claim 7.

19. The process according to claim 18 comprising a step of polymerising at least one olefin in the presence of a polymerisation diluent.

20. The process according to claim 19 wherein the polymerisation diluent is the same as the diluent in the catalyst feed vessel.

* * * * *